June 19, 1951 G. B. HOGABOOM, JR 2,557,503

ANODE FOR ELECTROPLATING PHONOGRAPH RECORDINGS AND SHELLS PRODUCED THEREFROM

Filed April 6, 1949

INVENTOR.
George B. Hogaboom, Jr.,
BY George D. Richards,
Attorney

Patented June 19, 1951

2,557,503

UNITED STATES PATENT OFFICE 2,557,503

ANODE FOR ELECTROPLATING PHONOGRAPH RECORDINGS AND SHELLS PRODUCED THEREFROM

George B. Hogaboom, Jr., Kenilworth, N. J.

Application April 6, 1949, Serial No. 85,868

9 Claims. (Cl. 204—212)

This invention relates to improvements in anodes for electroforming reproductions of sound track formations from a recording disc to obtain master discs or shells therefrom, to obtain mother discs or shells from the master discs or shells, and to obtain stamper discs or shells from the mother discs or shells; the latter discs or shells being used for duplicating the original phonograph recording.

In the art of mass production of phonograph records, it is common practice to silver or metalize the sound track face of an original recording and then, by electrodeposition, to form on said track face of the recording a metallic disc or shell which provides a negative of the sound track, the latter disc or shell being commonly referred to as a "master." After the master is thus formed, it is stripped from the original recording. On the sound track face of the master thus obtained is formed, by electrodeposition, a second metallic disc or shell which provides a duplicate or positive of the original recording, and which is commonly referred to as a "mother." The mother thus produced is then stripped from the master. On the sound track face of the mother is then formed, again by electrodeposition, a third metallic disc or shell which produces a negative of the original recording, and which is commonly referred to as a "stamper." Stampers thus produced furnish molds or discs by means of which duplicates of the original record disc and its recording may be pressed or molded to obtain phonograph records for commercial distribution.

The electroplating processes for producing master, mother and stamper discs or shells is sometimes carried out by simply suspending the disc or shell to be plated in one electrolyte, such e. g. as an acid copper plating solution, in opposition to a flat anode plate; the plating solution being sometimes agitated by blowing air therethrough, with the object of maintaining a uniform condition of the solution, and so as to prevent accumulation of gas bubbles on the surface of the plating. Faster plating is often obtained by rotating or oscillating the suspended disc or shell in parallel plane opposed to the face of the ordinarily flat anode. It has been found, however, when such methods of plating are employed, the edges and marginal portions of the disc or shell subjected thereto plate faster than does the center portion thereof; due, it is believed, to the fact that the plating current appears to move more freely from the anode to said edge portions of the disc or shell, with the consequence that the metallic deposit being formed becomes heavier or thicker at such areas than at the center area. A differential of from .030 in. at the center area to .045 in. at the edge areas frequently resulting. Such non-uniformity of deposit thickness is not desirable, for the ideal disc or shell should be of uniform thickness throughout its area and extent.

In experiments leading to the present invention, it has been found that a metallic deposit of substantially uniform thickness can be plated upon a disc or shell, as the case may be, if a cone-shaped anode is employed, and if such anode is disposed relative to the disc or shell with its apex opposed to the center of the disc or shell. The uniformity of the deposit is further assured if the disc or shell is rotated or oscillated in horizontal plane above the cone-shaped anode which is opposed thereto. Such cone-shaped anode appears to effect substantially uniform current flow from anode to all portions of the opposed face surface of the disc or shell, and consequently the plating effect is balanced and uniform with respect to all portions of the area of the surface of the disc or shell opposed to the anode.

Although the use of a cone-shaped anode effects better control and uniformity of current flow to the face of a disc or shell which is being plated, and consequently produces a substantially uniform deposit of metal thereupon, it nevertheless appears that such cone-shaped anode tends to allow gas bubbles and dirt from dissolving anode material or other source to accumulate and sometimes adhere to the central area of the deposit, with the undesirable result that irregular and rough deposit of plating metal in such central area of the disc or shell is likely to occur.

Having the above stated circumstances in view, it is an object of this invention to provide a novel anode structure of conical form which not only provides the uniform electrical current distribution between the same and the face of the disc or shell being plated, and which is conducive to desired uniform plating effect, but which, additionally, is so constructed that, when opposed to a rotated or oscillated disc or shell, a circulatory flow of plating solution will be induced between the anode and the face of the disc or shell, while the latter is undergoing plating, whereby gas bubbles and dirt will be swept and borne away from the center area of said face, and thus prevented from accumulating there so as to cause irregular or rough plating deposit in such area; an effect which it is highly desirable to avoid.

An illustrative embodiment of this invention is shown in the accompanying drawings, in which.

Similar characters of reference are employed in the hereinabove described views, to indicate corresponding parts.

Figures 1, 2, 3, 4:
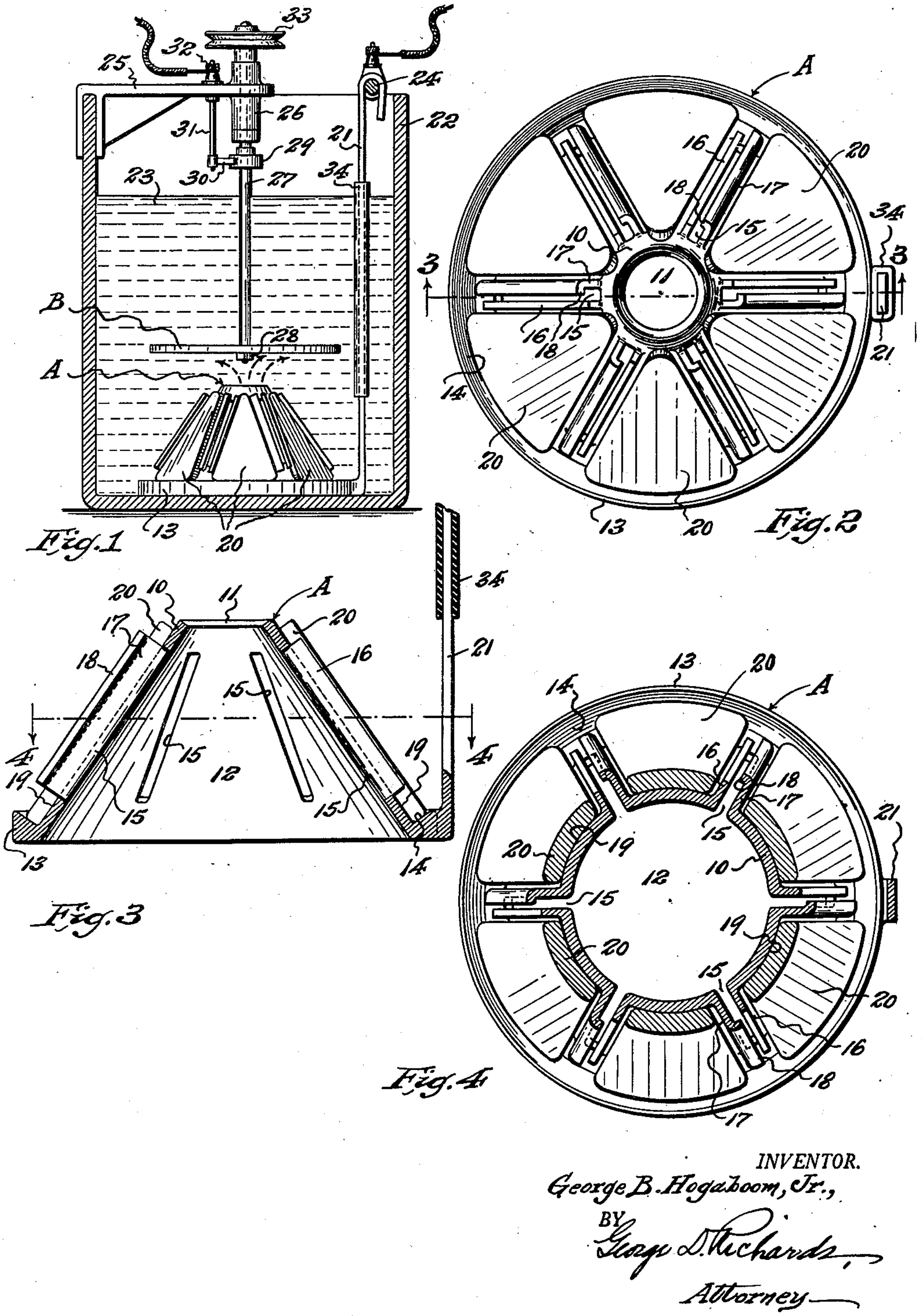
Fig. 1 is a vertical cross sectional view showing a plating tank equipped with means for rotating a disc or shell suspended in its contained plating solution in opposition to a novel construction of anode made according to this invention.
Fig. 2 is a top plan view of a novel anode according to this invention, drawn on an enlarged scale.
Fig. 3 is a vertical cross sectional view thereof, taken on line 3—3 in Fig. 2.
Fig. 4 is a horizontal sectional view thereof, taken on line 4—4 in Fig. 3.

Referring to the drawings, the reference character A indicates a preferred embodiment of a novel anode structure according to this invention, the same comprising a frame made of an electrically conductive metal which is substantially insoluble in the electrolyte or plating solution used in any given case, and a plurality of soluble plating anode members adapted to be supported by said frame on the exterior thereof.

The frame of the novel anode structure comprises a hollow body 10 of truncated conical shape having an opening 11 leading out of its interior 12 from its upper or apical end. At its base, said body 10 is provided with an exteriorly projecting, annular bottom flange 13, the same being so shaped as to provide a stop wall 14 which is angularly opposed to and so as to project outwardly from the plane of the external surface of said body 10. The walls of the body 10 are pierced to provide a plurality of circumferentially spaced slots 15 of suitable length which communicate with the interior 12 of the body. Said slots 15 extend radially relative to the apical portion of the body 10 so as to lie intermediate said apical portion and the bottom flange 13 of said body. Bordering one side of each slot 15, to extend substantially along the entire length thereof, and so as to project exteriorly from the external surface of the body 10, is a stop flange 16 of limited height, preferably not in excess of the thickness of plating anode members hereinafter described. Bordering the opposite side of each slot 15, also to extend substantially along the entire length thereof, and so as to likewise project exteriorly from the external surface of the body 10, is a deflector baffle 17 of height substantially exceeding the thickness of the plating anode members hereinafter described. Each deflector baffle 17 terminates at its free margin in an angular deflector or scoop lip 18 which overhangs the bordering slot 15.

The areas of the external surface of the body 10 which lie intermediate the slots 15 are of sectoral shape, and provide supporting seats 19 for soluble plating anode members 20, which are of corresponding peripheral shape and of suitable thickness. When operatively assembled on and so as to be supported by the body 10 of the frame, the bases of said plating anode members are adapted to abut the stop wall 14 of the bottom flange 13 of said body, so as to be held against downward longitudinal displacement relative to the latter. Each supporting seat 19 is bounded on one side by a stop flange 16, and on its other side by the back of a deflector baffle 17, so that a plating anode member 20, when engaged upon a seat 19, is held by and between a stop flange 16 and a deflector baffle 17 against lateral displacement or shifting relative to the body 10 of the frame.

Connected with the periphery of the bottom flange 13 of the frame body 10 is a conductor arm or strip 21, which is adapted to extend upwardly therefrom for connection with an electrical circuit terminal bar of a plating tank.

Referring to Fig. 1 of the drawings, the novel anode structure A of this invention, as therein shown, is operatively disposed within a plating tank 22 in opposition to a disc or shell B which is to be plated. The tank 22 is provided with means for suspending the disc or shell B in the plating solution 23 contained therein, subject to rotation in horizontal plane. The anode structure A is submerged in the plating solution 23 so as to occupy an axially aligned position beneath the suspended disc or shell B, in suitably spaced relation to the latter. When the anode structure A is thus disposed, its conductor arm or strip 21 extends upwardly to and is suitably electrically engaged with an electrical circuit terminal bar 24, by which plating current is to be served to the anode structure.

The means for suspending and rotating the disc or shell B in the tank 22 is subject to variation in form and construction, but, as illustratively shown, comprises a suitable supporting bracket 25 for attachment to the tank 22 in overhanging relation thereto. Said supporting bracket 25 is provided with a bearing 26 in which is rotatably mounted a dependent perpendicular shaft 27 for suspending and rotating the disc or shell B. The disc or shell B is detachably affixed to the lower extremity of the shaft 27, as by a coupling nut 28, and in such manner as to be in electrical contact with the shaft. In order to connect the shaft and disc or shell in the electrical plating circuit, said shaft is provided with a slip or collector ring 29 which is adapted to be engaged by a contact brush 30, the support 31 of which is adapted to be connected in the plating circuit through a terminal binding post 32 or the like. On the upper end of the shaft 27 is fixed a drive pulley 33 to which power may be transmitted from a suitable source, whereby to impart the desired rotary movement to the disc or shell B.

Ordinarily, an electro-formed disc shell to be obtained by the plating of the disc or shell B is produced by electrolytically deposited copper, and, in such case, the electrolyte or plating solution would be an acid copper solution, and the soluble plating anode members 20 would comprise blocks of metallic copper. The frame body 10 by which the soluble plating anode members 20 are supported, in such case, is made of lead, which metal is substantially insoluble in the acid copper electrotype of plating solution.

Since portions of the insoluble lead frame body 10, including the stop flanges 16 and deflector baffles 17, are exposed between the soluble plating anode members 20, uniformly alternated areas of soluble and insoluble anode surfaces are presented to the disc or shell B. This is of advantage, since it tends to prevent an undesired gradual up-building or increase of the copper content of the electrolyte or plating solution. In addition to this, due to the conical shape of the anode structure A, and the axially aligned opposed disposition of the latter relative to the disc or shell B, a substantially uniform anode surface is presented to the latter, which is maintained as the soluble plating anode members wear down.

In order to prevent electrical current flow directly from the conductor arm or strip 21 of the anode structure A to the peripheral edge of the suspended and rotated disc or shell B, which, if permitted, risks increase of marginal deposit upon the latter to the detriment of desired uniformity of deposit throughout the area thereof, said conductor arm or strip 21 is provided with an enveloping sheath or sleeve 34 of electrically non-conductive material, such e. g. as rubber.

In the operation of plating the disc or shell B with the aid of the novel anode structure A, as the disc or shell B is rotated in clockwise direction, its rotary movement is transmitted to the plating solution 23, thus imparting to the solution, which surrounds the anode structure A, a swirling or vortical movement around the external surface of the latter. This swirling flow of solution is also in clockwise direction, and toward the deflector baffles 17 of the anode structure, so that the deflector or scoop lips 18 of the latter will engage and deflect some of such flow for movement inwardly through the slots 15 into the interior 12 of the anode structure. Such inflow of the solution into the anode structure interior produces an internal fluid pressure within the same, whereby to cause an outward and upward discharge flow of solution through the apical opening 11 of the anode structure. Such discharge flow of solution is directed upwardly so as to impinge upon the central portion of the rotating disc or shell B, thence to spread outwardly along the surface of the latter with a sweeping action, which is highly effective in sweeping and bearing away from said surface any gas bubbles or dirt tending to accumulate and adhere thereto, and especially with respect to the central area of said surface. As a consequence of this, not only is a desirable circulation of the plating solution induced, but, at the same time, the directed sweeping action of solution flow relative to the face of the disc or shell B assures constant cleaning of said face, and thus better assures the attainment of an even plating deposit of uniform thickness throughout the surface area of said face, to which result the conical shape of the anode structure A primarily contributes.

One of the major sources of dirt is particles thereof freed from dissolving material of the anode members 20 during the plating operation. Such free dirt will be swept, by the current of solution flow, through the slots 15 of the anode A into the interior of the latter. Since the current flow of solution is not of high velocity, opportunity is given, within the interior 12 of the anode, for much of this free dirt to settle by gravity and thus accumulate within the bottom of the anode at the center thereof, from whence it may be easily removed when the plating tank is cleaned.

Although the anode members 20 are shown in the drawings and above described as of one-piece, and of preferably sectoral shape, it will nevertheless be understood that other forms and shapes of anode members may be utilized, such e. g. as a plurality of small spherical or other shaped bodies adapted to be assembled or stacked upon the anode frame so as to be supported upon the seats 19 between the flanges 16 and baffles 17 thereof.

It is possible to provide an anode within the principles of this invention which comprises the hollow conical body 10 having the apical or top discharge opening 11 and the entering slots 15 in its side walls bordered by the deflector baffles 17—18 as above described, but which body is made of plating metal that is soluble in the plating solution. In such case, the separable plating anode members 20 would be omitted. With such modified form of anode, both the induced gas bubble and dirt sweeping flow of plating solution, as well as the controlled direction of plating current flow to the disc or shell B would still be provided, with all the attendant advantages above referred to.

Having now described my invention, I claim:

1. An electroplating anode structure for stationary axial opposition to a disc-shaped cathode in a plating tank comprising a hollow conical frame body of electrically conductive metal which is substantially insoluble in the plating solution to be used, said body having an opening at its apical portion leading out of its interior, said body being further provided in its sides with circumferentially spaced slots radial to its apical portion to lead into the interior of the body, externally projecting deflector baffles bordering sides of the slots to divert flow of plating solution through the slots into the interior of the body for discharge through said apical opening of the latter toward the work, soluble plating anode members and means on the body supporting the plating anode members upon the external surface of the body intermediate the slots thereof.

2. An electroplating anode structure as defined in claim 1, wherein the means on the body supporting the plating anode members includes an outwardly projecting annular base flange having an internal stop wall substantially perpendicular to the external surface of the frame body upon which bottom ends of the plating anode members are abutted.

3. An electroplating anode structure for stationary axial opposition to a rotatable disc-shaped cathode in a plating tank comprising a hollow conical frame body of electrically conductive metal which is substantially insoluble in the plating solution, said body having an opening at its apical portion leading out of its interior, said body being further provided in its sides with circumferentially spaced slots radial to its apical portion to lead into the interior of the body, externally projecting deflector baffles bordering corresponding sides of the slots to divert flow of plating solution through the slots into the interior of the body for discharge through said apical opening of the latter toward the work, externally projecting stop flanges bordering the opposite sides of said slots, soluble plating anode members supported by the frame body in the areas between said slots and their bordering deflector baffles and stop flanges, and an external annular base flange projecting from the bottom periphery of said frame body and having a stop wall upon which the supported plating anode members are abutted and stopped against longitudinal displacement from the frame body.

4. In an electroplating apparatus, the combination of a plating tank adapted to contain a suitable plating solution, means for supporting and turning a disc-shaped article of work upon a pivotal axis within the plating tank whereby circulatory motion is imparted to the plating solution, an electroplating anode comprising a hollow conical body having an opening at its apical portion leading out of the interior thereof, said anode body being mounted within the plating tank in axial alignment with the axis of the pivotal supporting means for the work and with the outside end face of its apical portion directly opposed to the said work supporting means, said anode body being provided in its sides with circumferentially spaced slots radial to its apical portion to lead into the interior of said body, and externally projecting deflector baffles bordering corresponding sides of the body slots to divert flow of plating solution through said slots into the body interior for subsequent discharge through said apical opening of the later in an axial stream directed against the central area of the work to sweep away bubbles and dirt therefrom.

5. In an electroplating apparatus as defined in claim 4, an angularly projecting scoop lip on the free margin of each deflector baffle in overhanging relation to the bordering body slot.

6. In an electroplating apparatus, the combination of a plating tank adapted to contain a suitable plating solution, means for supporting and turning a disc-shaped article of work upon a pivotal axis within the plating tank whereby circulatory motion is imparted to the plating solution, an electroplating anode comprising a hollow conical frame body of electrically conductive metal which is substantially insoluble in the plating solution, said frame body having an opening at its apical portion leading out of the interior thereof and being mounted within the plating tank in axial alignment with the pivotal supporting means for the work and with the outside face of its apical portion directly opposed to the said work supporting means, said frame body being further provided in its sides with circumferentially spaced slots radial to its apical portion to lead into the interior of said body, externally projecting deflector baffles bordering corresponding sides of the body slots to divert flow of plating solution through the slots into the interior of the body for subsequent discharge through the apical opening of the latter in an axial stream directed against the central area of the work to sweep away bubbles and dirt therefrom, and soluble plating anode members supported by the frame body on the exterior face thereof intermediate its slots.

7. In an electroplating apparatus, the combination of a plating tank adapted to contain a suitable plating solution, means for supporting and turning a disc-shaped article of work upon a pivotal axis within the plating tank whereby circulatory motion is imparted to the plating solution, an electroplating anode comprising a hollow conical frame body of electrically conductive metal which is substantially insoluble in the plating solution, said frame body having an opening at its apical portion leading out of the interior thereof and being mounted within the plating tank in axial alignment with the pivotal supporting means for the work and with the outside face of its apical portion directly opposed to the said work supporting means, said frame body being further provided in its sides with circumferentially spaced slots radial to its apical portion to lead into the interior of said body, externally projecting deflector baffles bordering corresponding sides of the body slots to divert flow of plating solution through the slots into the interior of the body for subsequent discharge through the apical opening of the latter in an axial stream directed against the central area of the work to sweep away bubbles and dirt therefrom, an external base flange projecting from the bottom periphery of the frame body and having an upper annular stop wall, soluble plating anode members of flat sectoral form supported by the frame body in the areas between said slots with the lower edges of said anode members abutting upon the said annular stop wall, external stop flanges bordering corresponding sides of the body slots and projecting outwardly from the body periphery to an extent substantially equal to the thickness of the sectoral anode members for contact with side edges of adjacent members, and external deflector baffles bordering the sides of the body slots opposite to the said stop flanges and projecting outwardly from the body periphery beyond the adjacent anode members to divert flow of plating solution through the slots into the interior of the body for subsequent discharge through the apical opening thereof in an axial stream directed against the central area of the work to sweep away bubbles and dirt therefrom.

8. In an electroplating apparatus as defined in claim 7, an angularly projecting scoop lip on the free margin of each deflector baffle in over-hanging relation to the bordering body slot.

9. In an electroplating apparatus as defined in claim 7 including means to electrically connect one pole of a source of current to the work supporting means, an electrical conductor arm rising from the anode through the tank past the said work supporting means for connection to the opposite pole of the source of current, and a sheath of electrical insulation material enveloping the intermediate part of the said conductor arm where it passes close to the work whereby leak of current from said conductor arm laterally to the edges of the work is prevented.

GEORGE B. HOGABOOM, JR.

REFERENCES CITED

The following references are of record in the file of this patent:

UNITED STATES PATENTS

| Number | Name | Date |
|---|---|---|
| 662,525 | Davidson | Nov. 27, 1900 |
| 1,066,570 | Avery | July 8, 1913 |
| 1,219,333 | Kynaston | Mar. 13, 1917 |
| 1,280,249 | Landry | Oct. 1, 1918 |
| 1,599,284 | Proctor | Sept. 7, 1926 |
| 2,072,170 | Herzog | Mar. 2, 1937 |
| 2,125,037 | Sykes | July 26, 1938 |

FOREIGN PATENTS

| Number | Country | Date |
|---|---|---|
| 251,763 | Germany | Oct. 9, 1912 |
| 453,275 | Germany | Dec. 6, 1927 |